United States Patent
Parthasarathi et al.

(10) Patent No.: US 11,400,889 B2
(45) Date of Patent: Aug. 2, 2022

(54) UWB RANGING DEVICE, PERSONAL COMMUNICATIONS DEVICE INCORPORATING SUCH A DEVICE, AND METHODS OF OPERATING THE SAME

(71) Applicant: NXP B.V., Eindhoven (NL)

(72) Inventors: Srivathsa Masthi Parthasarathi, Bangalore (IN); Ghiath Al-kadi, Graz (AT); Brian Charles Cassidy, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/111,618

(22) Filed: Dec. 4, 2020

(65) Prior Publication Data

US 2021/0170991 A1   Jun. 10, 2021

(30) Foreign Application Priority Data

Dec. 6, 2019 (IN) .............................. 201911050519

(51) Int. Cl.
| | |
|---|---|
| H04W 4/38 | (2018.01) |
| B60R 25/24 | (2013.01) |
| H04W 4/48 | (2018.01) |
| G01S 13/76 | (2006.01) |
| H04B 1/7163 | (2011.01) |
| H04W 4/02 | (2018.01) |
| H04W 52/02 | (2009.01) |

(52) U.S. Cl.
CPC .......... *B60R 25/245* (2013.01); *G01S 13/765* (2013.01); *H04B 1/7163* (2013.01); *H04W 4/023* (2013.01); *H04W 4/38* (2018.02); *H04W 4/48* (2018.02); *H04B 2201/71634* (2013.01); *H04W 52/0251* (2013.01)

(58) Field of Classification Search
CPC ..................................................... B60R 25/245
See application file for complete search history.

(56) References Cited

U.S. PATENT DOCUMENTS

| | | | | |
|---|---|---|---|---|
| 9,593,522 | B1* | 3/2017 | Murar | ................ G07C 9/00174 |
| 2015/0291127 | A1* | 10/2015 | Ghabra | ................... G01P 15/00 |
| | | | | 701/2 |
| 2016/0322701 | A1 | 11/2016 | Lin et al. | |
| 2019/0275986 | A1* | 9/2019 | Yakovenko | ............. B60R 25/01 |

(Continued)

OTHER PUBLICATIONS

Google Git; Android / Device / Samsung / Manta / jb-mr1-dev / libsensors / sensors.cpp; Copyright © 2012 An Android Open-Source Project; Retrieved from the Internet: https://android.googlesource.com/device/samsung/manta/+/jb-mr1-dev/libsensors/sensors.cpp.

(Continued)

*Primary Examiner* — Qutbuddin Ghulamali

(57) ABSTRACT

An ultra wide band, UWB, ranging device is disclosed comprising: an input for receiving data directly from a sensor hub, and a radio configured for UWB communication; wherein the UWB device is configured to: commence a ranging process comprising at least one of a repeated range determination, and a repeated angle of arrival determination; receive sensor data from the sensor hub; process the data, and modify the ranging process in dependence on the data. Personal communication devices disclosing such UWB ranging devices are also disclosed as are associated methods.

15 Claims, 4 Drawing Sheets

(56) References Cited

U.S. PATENT DOCUMENTS

2019/0387360 A1* 12/2019 Kean ............... H04W 4/029
2020/0182996 A1*  6/2020 Lee ................. G01S 13/785

OTHER PUBLICATIONS

GitHub; Torvalds/Linux Drivers HID HID-Sensor-Hub; Copyright © 2012, Intel Corporation; Retrieved from the Internet: https://github.com/torvalds/linux/blob/master/drivers/hid/hid-sensor-hub.c.

INFSOFT Smart Connected Locations; Indoor Positioning with Ultra-Wideband; No date located for this article on INFSOFT website; retrieved from the Internet Nov. 11, 2020; https://www.infsoft.com/technology/sensors/ultra-wideband.

* cited by examiner

UWB RANGING DEVICE, PERSONAL COMMUNICATIONS DEVICE INCORPORATING SUCH A DEVICE, AND METHODS OF OPERATING THE SAME

CROSS-REFERENCE TO RELATED APPLICATIONS

This application claims priority under 35 U.S.C. § 119 to India Patent Application No. 201911050519, filed on Dec. 6, 2019, the contents of which are incorporated by reference herein.

FIELD

The present disclosure relates to ultra wideband, UWB, ranging devices. It further relates to personal communication devices incorporating such UWB devices, and to methods of operating the same.

BACKGROUND

Communication using UWB is becoming increasingly of interest in a variety of applications. An example of one such application is in the field of vehicle access, where UWB is becoming the technology of choice for the replacement of conventional keys, for keyless access. UWB communications operate at relatively high frequencies (typically up to tens or hundreds of gigahertz) and as a result the short wavelengths may be utilised to provide accurate distance information. Moreover, UWB communications provide for the transfer of information such as accurate time-stamp data. This can readily facilitate time-of-flight measurements between a transmitter and receiver, which in turn can allow for ranging—that is to say, determination of the distance between the transmitter and receiver.

Recently, UWB devices have started to be deployed in personal communication devices such as smart phones. A user may then use the smart phone or communication device to access purposes, for instance to access a building or a vehicle, in two stages: firstly, by using the UWB device for ranging, in order to determine that the user is close enough to the building or vehicle to require or desire that the building or vehicle be unlocked, and secondly to securely communicate with the building or vehicle in order to unlock, and/or otherwise prepared for access (for instance, interior or exterior lighting may be switched on). Of course, these stage may overlap or be combined. The second stage may even be wholly subsumed into the first stage, or not required in certain applications, such as in which the ranging itself may provide appropriate security.

SUMMARY

It is an object of the present disclosure to enhance the use of such UWB devices.

According to a first aspect of the present disclosure there is provided an ultra wideband, UWB, ranging device comprising an input for receiving data directly from a sensor hub, and a radio configured for UWB communication; wherein the UWB device is configured to: commence a ranging process comprising at least one of a repeated range determination and a repeated angle of arrival determination; receive sensor data from the sensor hub; process the data, and modify the ranging process in dependence on the data.

Thereby, the UWB device may use data from the sensor hub to enhance its operation, and optionally the operation of other components of a personal communications device into which the UWB ranging device may be integrated, such as in particular an applications processor. In particular the sensor hub may provide information on movement or orientation of the device and/or the user carrying or holding the device, which may be used by the device to assess the situation and take appropriate action, and in particular to suspend or modify the ranging process. By providing direct communication between the sensor hub and the UWB device, the device is not dependent on operation of other components, in particular an applications processor, to enhance its operation. In embodiments in which the UWB device consists solely of a UWB IC, this allows the ranging to be carried out independent of operation of other components such as applications processor. In typical personal communications devices such as smart phones, the applications processor generally consumes a relative large amount of power, so enabling operation of the UWB IC independent of the applications processor can save power since the applications processor can be powered-down or disabled. In other embodiments, ranging calculations may be made not within the UWB chip itself starts but in a part of the applications processor. In this case the UWB device comprises the UWB IC together with a part or partition of the applications processor. In such cases, the direct communication between the sensor hub and the UWB IC may provide that the application processor may be partially powered down.

In one or more embodiments, the ranging process comprises determination of an angle of arrival, without a repeated range determination. This may be done by a measuring the distance to two separate antennas on the device, for instance by determining the relative phases between the signals received by the two antennas, and using trigonometry to determine the reception angle or angle of arrival.

In one or other embodiments, the ranging process comprises repeated range determination without determination of an angle of arrival. This may require only one antenna: alternatively multiple antennas may be used.

In one or more embodiments the sensor data is spatial data relating to at least one of orientation, velocity and acceleration. Such data is generally most useful for determining a state of motion of the user. The sensor data may, in some circumstances include GPS (global positioning satellite) location data, for example in the event that the sensor hub includes GPS measurement capability. In some embodiments the sensor data may include other environmental data such as, without limitation, light sensor data which may provide information such as to whether the device is concealed, for instance in a pocket or handbag, or being carried in the open.

In one or more embodiments, the UWB device is configured to request sensor data from the sensor hub, and receive sensor data from the sensor hub in response to the request. In other embodiments, sensor data from the sensor hub may be generated autonomously.

In one or more embodiments, the data is unprocessed sensor data. In other embodiments, the data may be processed data. For example, data from a gyro in the sensor hub may be processed so as to provide an indication of the orientation of the communications device. Such information may be useful for instance in order to select one or more of a group of antennas provided on different faces of the device, or with different orientations, in order to improve or maximise the signal strength of one or both of transmitted or received UWB signals. In other embodiments the same antennas may be used, but a different algorithm applied to process the data in order to optimally determine the angle of arrival.

In one or more embodiments, the input is configured to communicate with the sensor hub using an I2C protocol.

According to a second aspect of the present disclosure, there is provided a personal communications device comprising a UWB ranging device as just described, and an applications processor.

In one or more embodiments, the UWB ranging device comprises a UWB integrated circuit, IC, and a UWB service module, wherein the UWB service module forms part of the applications processor. In such a communications device, the UWB service module may be used to configure the UWB IC or to control it's operation, and may in particular provide power management. In other embodiments, the control of the UWB communications is effected within the UWB IC itself, such that there is no separate UWB service module within the applications processor. Of course, it will be appreciated that the sensor hub may also be under the control of, or be configured by, a separate sensor hub module which may, or may not, form part of the applications processor. Alternatively control and/or configuration of the sensor hub may be effected within the sensor hub itself.

The UWB IC may be connected to the applications processor by means of a serial peripheral interface, SPI. In other embodiments other interfaces may be used.

In one or more embodiments, the personal communications further comprises further communication means for communicating by at least one of Bluetooth low energy, BLE, and near field communication, NFC, wherein the further communications means is configured to cooperate with the UWB device in order to, for example, effect access to a vehicle. For example, the UWB device may be configured to work alongside a BLE communication means in order to enhance communication with the vehicle and/or provide configuration information or other information, for example initiating an in-car entertainment system under the control of the personal communications device. Since BLE has, in general, a lower power requirement than UWB, it may be appropriate for instance to maintain BLE permanently on, and only use UWB when potentially in range of a UWB receiver, for instance as indicated by BLE.

In one or more embodiments, a one of the UWB IC and the applications processor is configured to modify the vehicle access process in dependence on the data by at least one of suspending, disabling or restarting communication by the further communication means. Thus, use of the data from the sensor hub may, in addition to being directly used by the UWB device, inform the communications device, and in particular the applications processor or the UWB device, about activities of the user and this information may be used in order to save power. This may done be, for instance, by suspending any BLE or NFC communication whilst a user is stationary and has the communications device in an orientation indicating that they are either taking a phone call or using the device to check emails, messages, or for example, using the personal communications device for other purposes, such as to pay for a parking session of the vehicle etc.

According to a third aspect of the present disclosure, there is provided a method of operating a UWB ranging device, the method comprising: commencing a ranging process comprising a repeated range determination; receiving sensor data directly from a sensor hub; processing the sensor data; and modifying the ranging process based on the processed sensor data.

In one of more embodiments modifying the ranging process comprises suspending the ranging process. In other embodiments, modifying the ranging process comprises restarting the ranging process. Other embodiments modifying the ranging process comprises adjusting the repetition rate of the repeated range determination.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
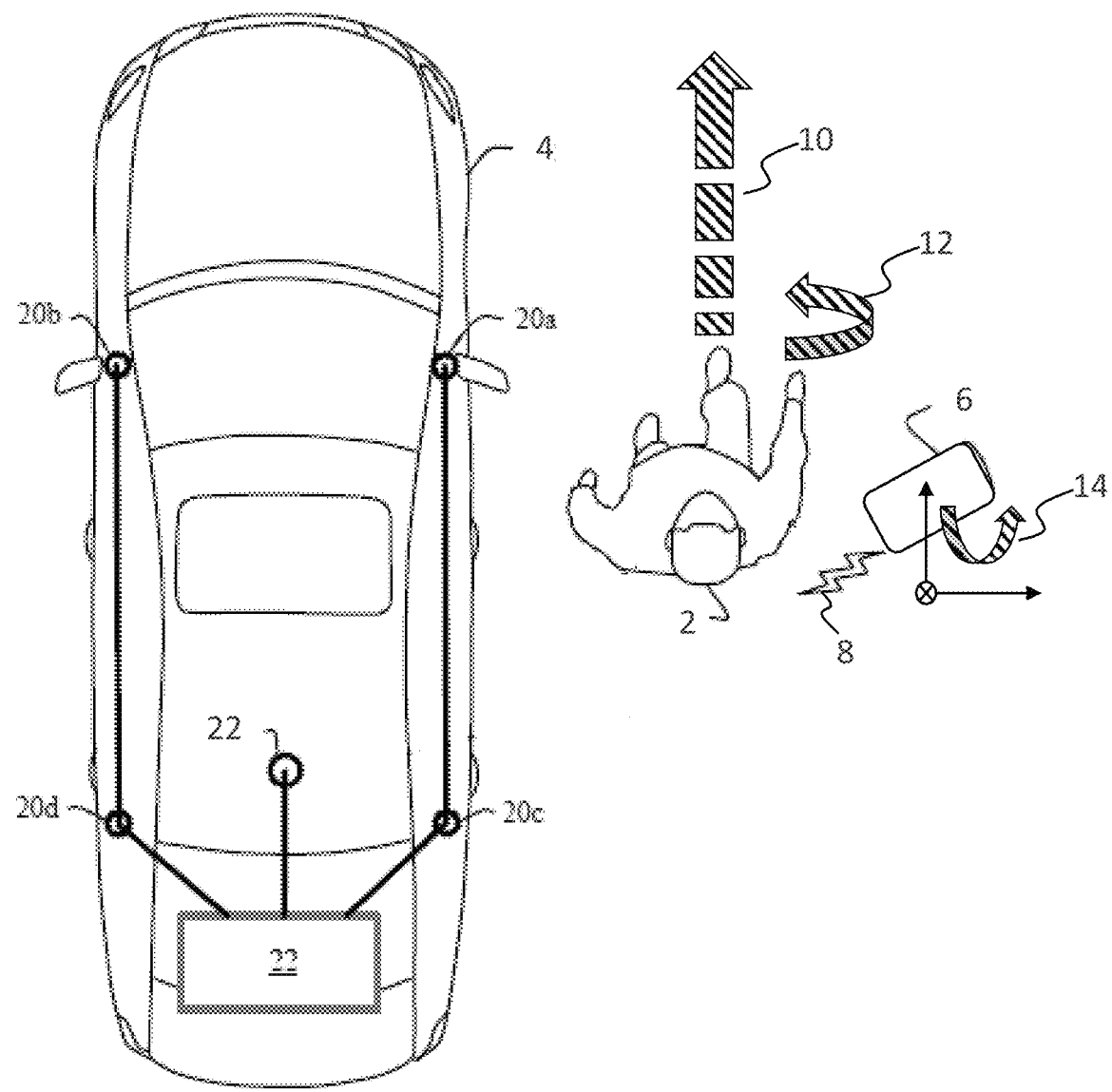
FIG. 1 shows in plan view an example of vehicle access, using UWB ranging according to one or more embodiments.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Modern personal communications devices such as smart phones typically include a variety of sensors for monitoring spatial, environmental and other parameters. Typically, the sensors may be co-located in a so-called "sensor hub". Alternatively, or more of the sensors may be distributed, and the data logically aggregated in the sensor hub. Thus, the sensor hub may be a single IC or a combination of an IC and other, discrete sensors. The sensor hub may even be a virtual IC, for instance a partition of some other processor. Generally such sensors may measure intrinsic properties such as the temperature of the device, or extrinsic properties, for instance depending on external fields such as magnetic field, light level, or gravitational field. Of particular relevance to the present disclosure are those sensors which linked to spatial determination, such as motion or orientation. Orientation can generally be determined by use of gyro or accelerometer parameters; similarly accelerometers can be used to determine motion or changes in motion. Some sensor hubs may include GPS (global positioning satellite) location sensing, which is also a form of spatial sensing.

The skilled person will be aware that the data such spatial sensors can be analysed in order to deduce information about the device or the use of the device. Such analysis or processing may be termed "situation analysis". For instance, pedometers, in which the data from gyros and accelerometers are analysed in order to determine whether the user is walking—typically characterised by periodic deceleration as the user's foot makes contact with the ground, in conjunction with relatively constant motion in one horizontal x- ory-direction, are now commonplace in smart phones. Similarly, orientation-based functionality, for instance switching off the display of the smart phone when the user raises the phone to his or her ear, is now commonplace—that feature generally being implemented on a determination of a change of the phone from a horizontal to vertical orientation, in conjunction with a change in height of 1 to 2 foot or approximately half a metre, which may be determined by gyros in the device. Typically, the sensor hub communicates with an applications processor in order to provide information to the processor which may then be deployed to various applications or services such as pedometers or displays, as discussed above.

According to the present disclosure, such movement-based or orientation-based characteristics of the device or the user of the device, as determined from data provided by the sensor hub in either raw or processed form, may be directly provided to an ultra wideband (UWB) IC (or to a UWB device in case the UWB device includes an IC and another IC or part of an IC, such as a dedicated partition of an applications processor) and used to enhance the functionality of a UWB ranging device. Providing the sensor data directly to the UWB device, rather than to an applications processor for onward distribution, can be particularly useful for power management. For instance the entire applications processor, or part of applications processor, may be allowed to be powered down or disabled even while the UWB device is operating in order to provide ranging information.

Ultra wideband, also known as pulse radio or impulse radio, is a radio technology that is able to use a relatively low energy level for short-range, high bandwidth communications over a relatively large portion of the radio spectrum. UWB radios are typically centred on frequencies in the gigahertz range, for example between 3.1 and 10.6 GHz, although they are also used in higher frequencies such as 70 GHz and 140 GHz. As mentioned in the introduction, a UWB radio may be configured to act as a ranging device, that is to say a UWB ranging device, to determine the distance or range between the UWB radio and a target object. The skilled person will be aware that this can be done by transmitting information including a timestamp, and then receiving further information from the target object, the further information also being transmitted by UWB and including another timestamp. The time-of-flight between the UWB radio and the target object may thereby be calculated, and since the speed of the electromagnetic signal is known—that is to say, the speed of light—the distance between the UWB ranging device and the target object may be determined.

Turning now to the figures, FIG. 1 shows, in plan view, a user 2 in the proximity of a vehicle 4. Associated with the user is a personal communication device 6. The personal communications device 6 may in particular be held by the user, or be in a user's pocket or handbag or the like.

The personal communication device 6 includes a UWB ranging device (not shown), which will be described in more detail herein below. The UWB ranging device transmits a UWB signal 8 as shown, to one or more receivers 20, 22 located on or in the vehicle 4. The receiver of receivers may be located centrally, such as at a central antenna position 22, or may be distributed. For instance, separate receivers 20a, 20b, 20c, and 20d, located proximate to each of the doors of the vehicle, or otherwise suitably located on or in the vehicle. One or more of the receivers is a transceiver, configured to transmit a return signal to the UWB ranging device in the personal communications device 6. Again as will be described in more detail herein below, the combination of the UWB ranging device and the vehicle mounted transceivers enables ranging. That is to say, it enables a determination of the relative distance between the UWB ranging device and the vehicle.

The user may be in motion, that is to say undergoing translational movement, as depicted by the arrow 10 in figure, or may be stationary. Moreover, the user may transition from a stationary state to being in motion, or vice versa. Furthermore, the user may turn around, that is to say may undergo rotational movement, as depicted by arrow 12 in FIG. 1. Each of the types of movements will directly affect the position, velocity, acceleration or orientation of the personal communication device 6.

Moreover, the user may reposition the personal communication device, independent of the user's own movement or rotation. For example, the user may bring the personal communication device close to their ear in order to make or receive a phone call. The personal communication device may then move in an arc from a position, for instance in a pocket or hand-bag, typically close to the user's waist to a position close to their head. To consider another example, the user may take the device out of a pocket or bag in order to use a mapping or orientation application or check or send a text or other message. In these examples the personal communication device may typically undergo a smaller change in position relative to the user, but may undergo a rotation, for instance such that the main screen moves from a vertical orientation to a horizontal orientation, depicted in FIG. 1 by the arrow 14.

It will be appreciated from consideration of the above examples and others which will ready come to mind, that it may be possible to deduce information about the user's occupation or intentions, from the spatial information associated with the personal communication device.

In the context of the present disclosure, the term "spatial" is to be interpreted broadly, including both positional information and orientation information and rates of change thereof (that is to say, it includes both velocity and acceleration information, and angular momentum etc.). Such spatial information is typically measured or measurable using a sensor hub in a personal communications device. As used herein, the term "sensor hub" may designate a single interconnected circuit (IC) which includes a plurality of sensors, or may include an integrated circuit incorporating one or more sensors together with one or more discrete sensors, or an assemblage of discrete sensors.

Consider for the moment some concrete examples or scenarios associated with one of the fields of application of the present disclosure—that of vehicle access. In a first scenario, the user is approaching the vehicle at a rate which suggests that they are walking towards the vehicle. The UWB ranging device starts to communicate with the vehicle in order to determine whether the user intends to access the vehicle. The UWB ranging device does this by repeatedly making range determinations by means of communicating with the transceivers on the vehicle. The user then stops—the cessation of motion may be identified by one or more gyroscopes in the sensor hub. Further, the user raises the phone to their ear in order to make or receive a phone call. Once more the motion may be identified using gyroscopes or accelerometers in the sensor hub. The UWB device may use the information supplied from sensor hub to determine that the user has interrupted their original intention of accessing the vehicle. The UWB device may then elect to suspend communication with the vehicle, by suspending the range determinations, thereby saving power, for the duration of the time that the user is stationary. Alternatively, the UWB device may elect to modify the repetition rate of the ranging determinations. Slowing the repetition rate will save power. It may also reduce congestion of radio traffic associated with UWB ranging in situations where there are several or many users carrying out ranging at the same time—for example in a large busy parking lot.

Or consider a second scenario. An applications processor within the personal communications device configures the UWB device to be able to form an angle of arrival, AoA, measurement relative to a node in the vehicle, the intention being to allow access to the vehicle once the angle of arrival reaches or exceeds a certain angle x. (The skilled person will appreciate that a combination of two or more such AoA, may provide information regarding proximity to the vehicle, and thereby be useful for enabling access). The personal communication device is then raised to the user's ear—again in order to make a receive a phone call. This alters the threshold angle of arrival to x' (consider the three-dimensional geometry involved). The UWB device may elect to adjust the AoA calculation as a result of the spatial information.

Or consider a third scenario: the UWB ranging device may be associated with one or more antennas mounted on a personal communications device and having different orientations. The coupling between the antenna of the UWB device and that of a transceiver on the vehicle depends on the relative orientation of the antennas, together with the angle between them. In this scenario, the spatial information associated with the personal communications device (such as whether the screen is vertical or horizontal) may be used by the UWB ranging device in order to select which one or more antennas to use to transmit and receive signals, for maximum efficiency.

Thus, according to a first aspect of the present disclosure, there is provided a UWB, ranging device, comprising a UWB radio, and an input for receiving data from a sensor hub. The UWB device is configured to receive spatial from the sensor hub, and process the data, and modify the ranging process in dependence on the data.

Note that the processing functionality of the UWB device may be carried out in a UWB integrated circuit itself, or may be carried out in a section of an applications processor within the personal communication device. To that extent, the term UWB device as used herein should be interpreted broadly and include a distributed sets of subunits which may include one or more integrated circuits.

Figure 2:
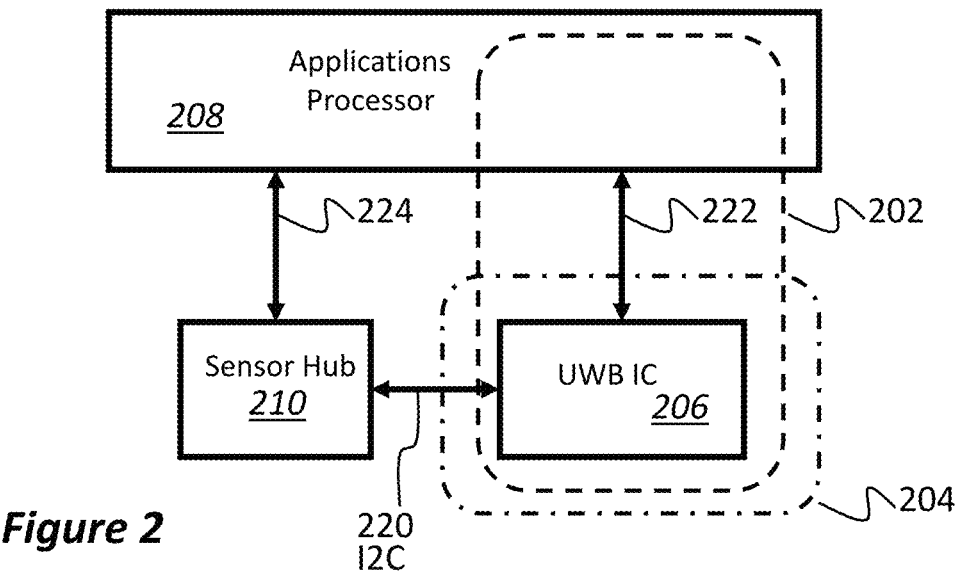
FIG. 2 shows schematically an arrangement including a UWB ranging device according to one or more embodiments.

Turning to FIG. 2, this shows a UWB ranging devices 202, and 204 according to one or more embodiments. The first UWB ranging device 202 comprises a UWB IC 206, and part of an applications processor 208. In one or more other embodiments, the UWB ranging device is entirely separate from the applications processor 208, as shown for second UWB ranging device 204. Also shown is a sensor hub 210 which is connected directly to the UWB IC. The sensor hub 210 may be connected to the UWB IC 206 by an interface configured to carry data according to the I2C (Inter-IC) protocol 220. Such a protocol is suitable for sensor data, however, the disclosure is not limited thereto, and other protocols or interfaces which directly connect the sensor hub to the UWB IC may be used. The UWB IC 206 is connected to the applications processor in a conventional manner—for instance it may be connected to the applications processor by a Serial Peripheral Interface, SPI, 222. However, the disclosure is not limited thereto, and other interfaces may be used. The sensor hub 210 may be separately connected to the applications processor by a system interface 224, as would be the case with a conventional personal communications device.

In a typical operation, the UWB device commences a ranging process. This may be, without limitation, under control of the applications processor, but would more commonly be initiated within the UWB IC itself. The ranging process may commence with multiple rounds of ranging, or range determination. Each round of ranging may include a handshake followed by there-and-back communication including timestamps in order to determine a time of flight between the UWB device and the vehicle and thus the distance between the two. The UWB ranging device is configured to request and receive data, including spatial information, directly from the sensor hub. It will be appreciated that, in general, the UWB device is a user of the sensor hub data and not a supply of sensor data. On receipt of the data, for example spatial information relating to at least one of orientation, velocity and acceleration, the UWB device processes the information, in particular to make a situation analysis. That is to say, the UWB device can make an algorithmic decision based on the sensor data. One such decision may be to re-adjust the ranging interval with the vehicle, that is to say the repetition rate of rounds of ranging. Thus, as a result of the situation analysis, the UWB device uses the processed data such as spatial information, to modify the ranging process.

Figure 3:
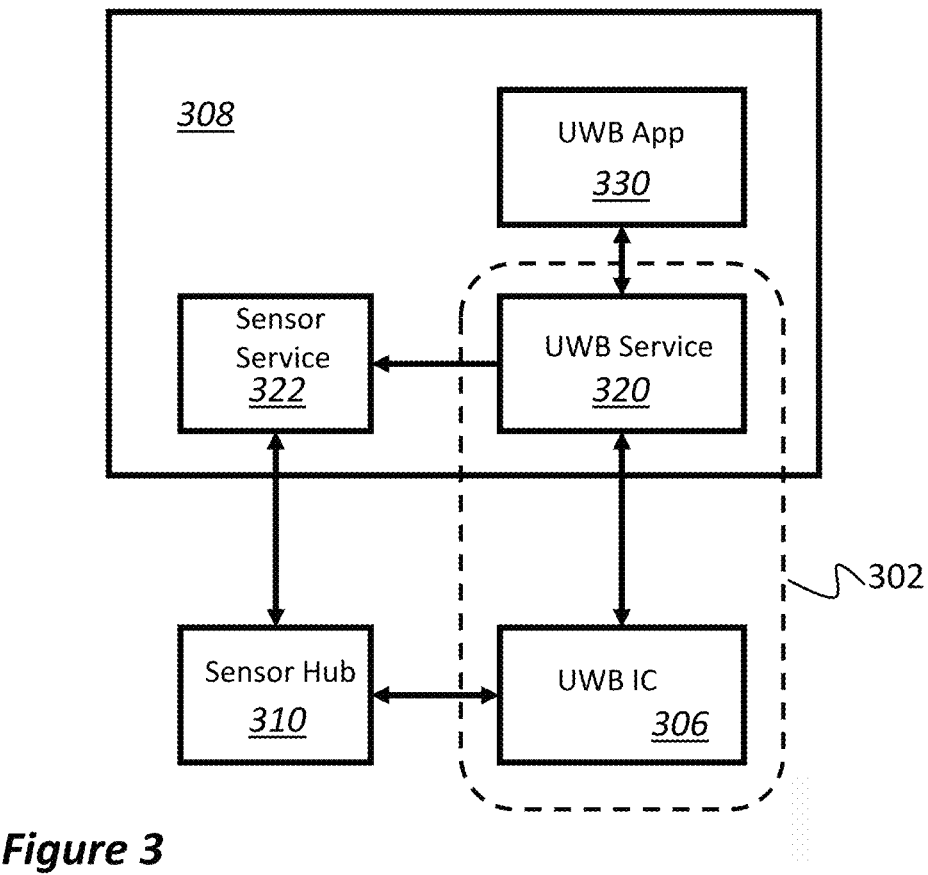
FIG. 3 shows schematically an alternative arrangement including a UWB ranging device according to one or more embodiments.

Turing to FIG. 3, this shows a UWB ranging device such as that depicted in FIG. 2, in greater detail. The figure shows a UWB ranging device 302 comprising a UWB IC 306 and a UWB service module 320, which forms part of an applications processor 308. The figure further shows a sensor hub 310, which is connected to a sensor service 322 which forms part of the applications processor. The applications processor also hosts a UWB app 330, the UWB service module 320 is thus an example of a service. As will be familiar to the person skilled in personal communications architecture, a service provides a generic set of functionality (such as providing distance). A service may be used by multiple apps for different purposes. For example, there could be an app for car access, an app for door access, an app for "Find my friend/tile". Each app—in this case, the UWB app 330—performs a particular function, all using the common UWB service layer. The UWB IC communicates with the sensor hub and the applications processor in a similar fashion to that described with respect to FIG. 2.

Figure 4:
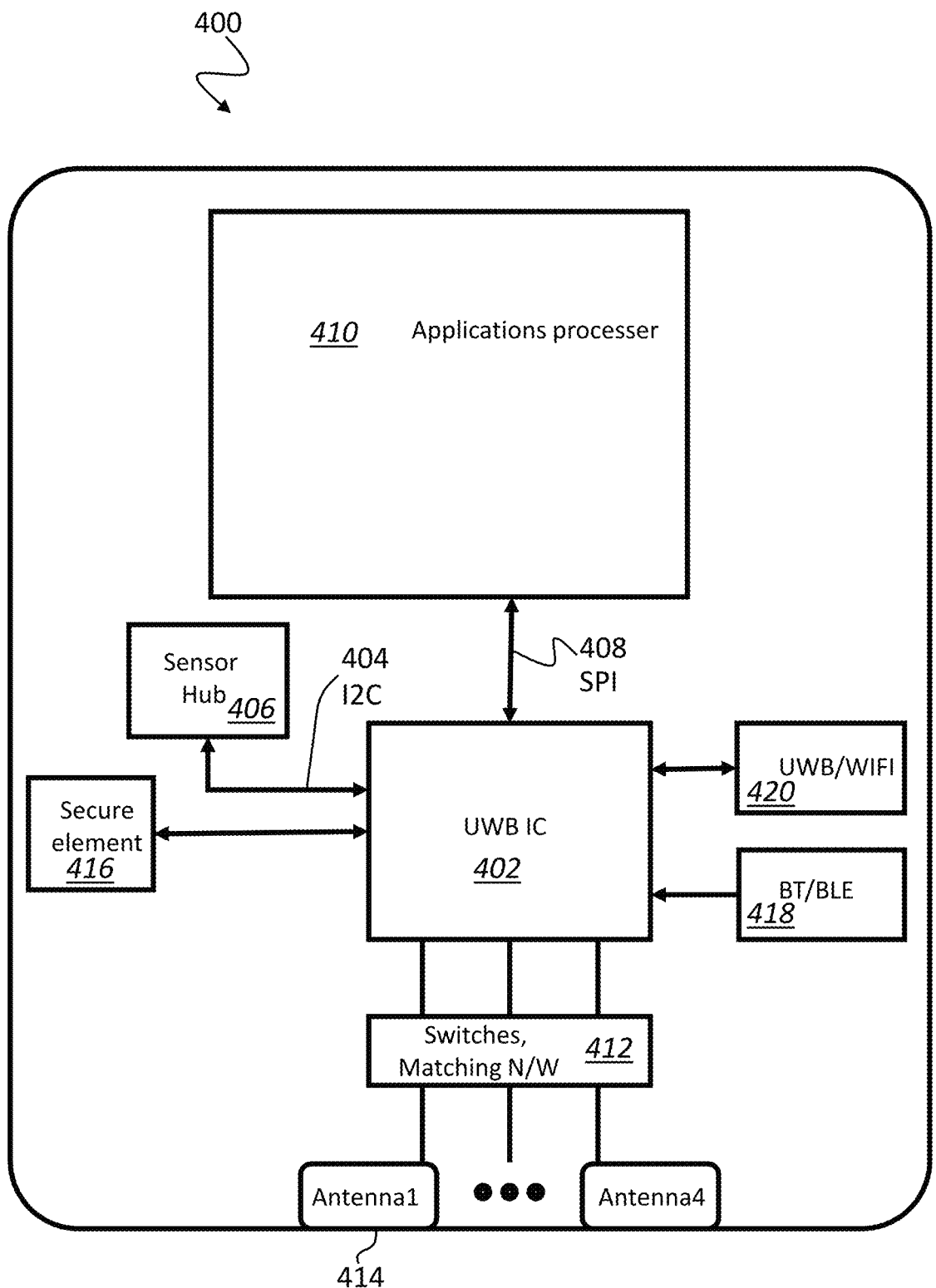
FIG. 4 shows schematically a personal communication device including a UWB IC according to one or more embodiments.

Turning now to FIG. 4, this shows relevant parts of a personal communications device 400 according to one or more embodiments. The personal communications processor includes a UWB IC 402. The UWB IC has an input 404 for receiving data from a sensor hub 406. The skilled person will appreciate that the sensor hub 406 could, alternatively, by part of applications processor 308. The UWB IC has an output 408 for transmitting data to an applications processor 410. The sensor hub is able to sense spatial information, which may include at least one of orientation, velocity and acceleration. The input 404 for receiving information of the sensor hub may may carry data conforming to an I2C protocol, or other suitable protocol. The output 408 may be an SPI interface to the applications processor.

The UWB IC 402 may be coupled via one or more switches and matching networks 412 to one or more antennas 414. As shown there may be four antenna; in other embodiments there may be a different number. These antennas may have different orientations or be aligned to different faces or surfaces of the personal communications device.

The personal communications device 400 may include a secure element 416. The secure element 416 may be coupled to the UWB IC and may be used for example to securely store information such as a master key, that may be required for the ranging. As a non-limiting example, in the instance that multiple UWB radios are deployed for secure ranging, they may share a master key, which may be established as part of the initial service provisioning and accessible only to those UWB radios involved in the secure ranging. This master Key may be stored in secure element 416.

The personal communication device 400 may further include other communication capability or mode. As a non-limiting example, there may be a Bluetooth or Bluetooth low energy device (BT/BLE) 418. The BT/BLE device may, be connected to the UWB IC by means of a new UART-bus (Universal asynchronous Receiver/Transmitter bus) or I2C protocol provide information to the UWB IC. As another, again non-limiting, example, the UWB IC 402 may further have an interface with a UW/WiFi device 420. Device 420 may, in some non-limiting examples, be a WLAN Co-existence system.

Although the description above in particular with reference to FIG. 2 has focused on use of UWB range in four access control and in particular to access to a vehicle, the present disclosure is not limited thereto. For example, the UWB en may be used for access to a building. In that case, the ranging may work in similar fashion to that described above with reference to a vehicle, but the subsequent access control may be affected by the same or other processes.

Figure 5:
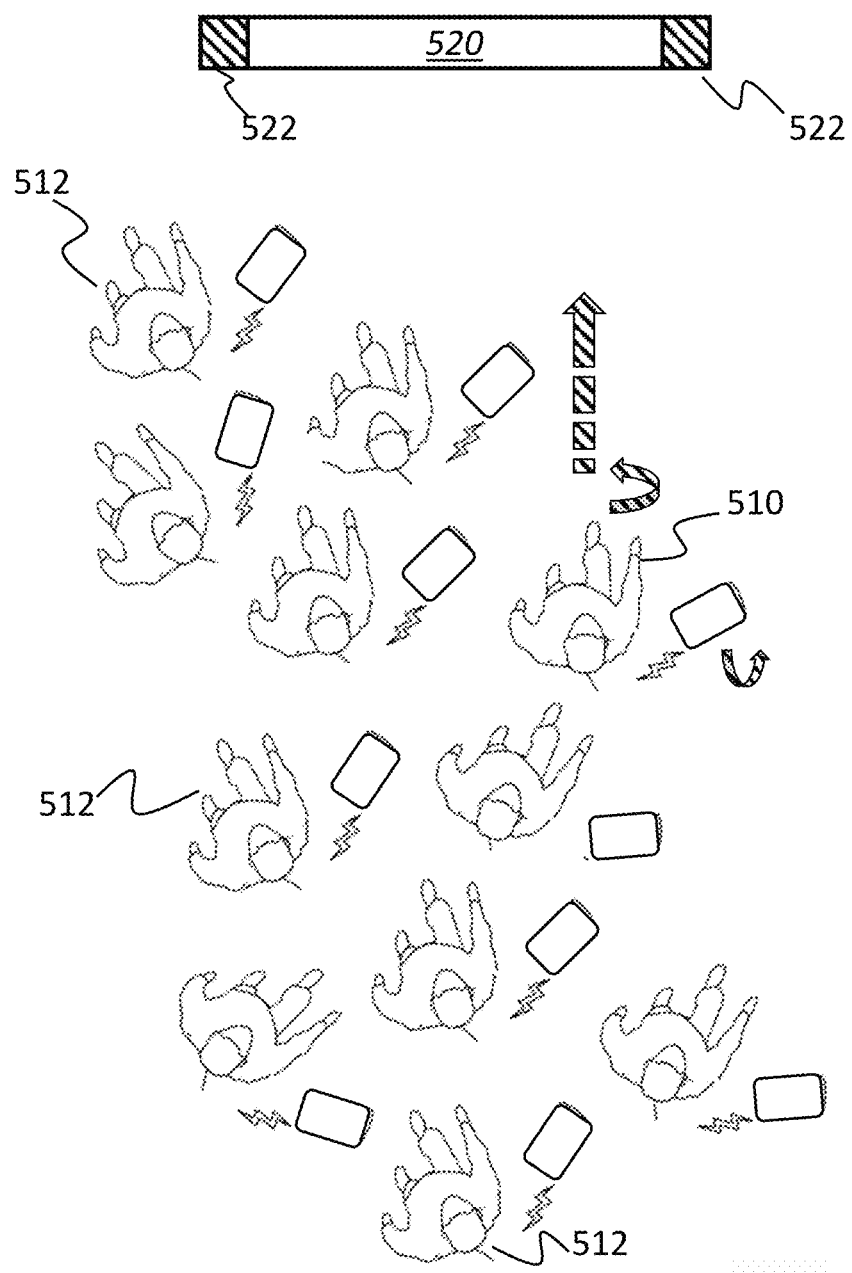
FIG. 5 shows a plan view of another use of UWB ranging according to one or more embodiments, in this case for access control.

Another scenario in which the UWB device according to one or more embodiments may be deployed is shown in plan view in FIG. 5. The figure shows several users 510, 512 in the general facility of an access or payment region 520. The access or payment region 520 has one or more UWB transceivers 522 mounted thereat. The access or payment region 520 may be, for instance, an entrance to a sports stadium, or an entrance to a transit system, for which for example either access is controlled or payment is required. In this sort of scenario, there may be several or many users, each having a personal communications device or smart-phone with a UWB device thereon. As a result, there may be a large amount of radio traffic associated with the UWB radios, and this could result in signal congestion and/or interference between signals. As discussed above, the UWB radio in smart-phone may be configured to communicate directly with a sensor hub in the smart-phone in order to undertake a situation analysis for the individual user. Again, as discussed above, the situation analysis may result in the determination that the user is stationary or is not approaching the access of payment region 520. This may be the case for instance if the user is waiting for a group of friends before entering a sports stadium together, or is waiting for a train to arrive at a railway station before boarding. The UWB device may then elect to suspend, adapt, modify, or restart the repeated range determination, based on processed data or unprocessed data (also known as "raw" data), directly received from the sensor hub. This in turn may result in a reduction of radio traffic, thereby ameliorating or even eliminating the problem of radio congestion associated with having many users in the vicinity.

From reading the present disclosure, other variations and modifications will be apparent to the skilled person. Such variations and modifications may involve equivalent and other features which are already known in the art of UWB ranging, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

We claim:

1. An ultra wideband (UWB) ranging device comprising a UWB integrated circuit (IC), wherein the UWB IC comprises:
   an interface connected to an applications processor;
   an input for receiving sensor data directly from a sensor hub, and
   a radio configured for UWB communication;
   wherein the UWB ranging device is configured to:
   commence a ranging process comprising at least one of a repeated range determination, and a repeated angle of arrival determination independent of operation of the applications processor;
   receive sensor data directly from the sensor hub;
   process the received sensor data, and
   modify the ranging process in dependence on the processed sensor data.

2. The UWB ranging device of claim 1, wherein the ranging process comprises a repeated range determination.

3. The UWB ranging device of claim 1, wherein the sensor data is spatial data relating to at least one of orientation, velocity and acceleration.

4. The UWB ranging device of claim 1, wherein the input is configured to communicate directly with the sensor hub using an I2C protocol.

5. The UWB ranging device of claim 1, further configured to request sensor data from the sensor hub, and receive sensor data from the sensor hub in response to the request.

6. The UWB ranging device of claim 1, wherein the sensor data is unprocessed sensor data.

7. A personal communications device comprising a UWB ranging device as claimed in claim 1, wherein the sensor hub is connected to the applications processor via a systems interface.

8. The personal communications device of claim 7, further comprising a UWB service module, wherein the UWB service module forms part of the applications processor.

9. The personal communications device of claim 7, further comprising a serial peripheral interface (SPI) connecting the applications processor and the UWB IC.

10. A vehicle access device consisting of the personal communications device according to claim 7.

11. The vehicle access device of claim 10, wherein one of the UWB IC and the applications processor is configured to modify a vehicle access process in dependence on the data.

12. A method of operating an ultra wideband (UWB) ranging device comprising a UWB integrated circuit (IC), the method comprising:
- interfacing the UWB ranging device with an applications processor;
- commencing a ranging process using the UWB ranging device, the ranging process comprising at least one of a repeated range determination and a repeated angle of arrival determination independent of operation of the applications processor;
- receiving, by the UWB ranging device, sensor data directly from a sensor hub;
- processing, by the UWB ranging device, the received sensor data; and
- modifying the ranging process based on the processed sensor data.

13. The method of claim 12 further comprising one of suspending the ranging process, adjusting a repetition rate of the range determination, and restarting the ranging process.

14. The method of claim 12 wherein commencing a ranging process comprises a repeated range determination.

15. The method of claim 12, wherein modifying the vehicle access process comprises deselecting a first UWB ranging antenna and selecting a second, different UWB ranging antenna.

* * * * *